(12) United States Patent
Wang et al.

(10) Patent No.: US 11,654,714 B2
(45) Date of Patent: May 23, 2023

(54) OMNIDIRECTIONAL WHEEL

(71) Applicant: Fulian Precision Electronics (Tianjin) Co., LTD., Tianjin (CN)

(72) Inventors: Pao-Ching Wang, New Taipei (TW); Ke-Cheng Lin, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 431 days.

(21) Appl. No.: 16/920,570

(22) Filed: Jul. 3, 2020

(65) Prior Publication Data

US 2021/0354507 A1    Nov. 18, 2021

(30) Foreign Application Priority Data

May 15, 2020 (CN) .......................... 202010412071.8

(51) Int. Cl.
*B60B 19/00* (2006.01)
*B60B 19/12* (2006.01)
*B60B 27/00* (2006.01)

(52) U.S. Cl.
CPC ............ *B60B 19/003* (2013.01); *B60B 19/12* (2013.01); *B60B 27/0015* (2013.01)

(58) Field of Classification Search
CPC .............................. B60B 19/003; B60B 19/12
See application file for complete search history.

(56) References Cited

U.S. PATENT DOCUMENTS

| | | | | |
|---|---|---|---|---|
| 6,857,707 B2 * | 2/2005 | Guile | ................... | B60B 19/003 16/45 |
| 7,431,148 B2 * | 10/2008 | Li | ........................ | B65G 39/025 198/786 |
| 7,566,102 B2 * | 7/2009 | Guile | .................. | B60B 33/0049 301/5.1 |
| 7,641,288 B1 * | 1/2010 | Baker | .................. | B60B 19/003 16/45 |
| 8,960,339 B2 * | 2/2015 | Schlee | ................... | B62D 61/00 180/7.1 |
| 10,618,348 B2 * | 4/2020 | Brandl | ................. | B60B 19/003 |
| 10,675,912 B1 * | 6/2020 | Liang | ................... | B60B 19/003 |
| 2012/0017392 A1 * | 1/2012 | Hwang | ................. | B60B 19/003 15/300.1 |
| 2013/0257138 A1 * | 10/2013 | Chang | .................... | B60B 19/12 301/5.23 |
| 2021/0114406 A1 * | 4/2021 | Sutherland | ............ | B60B 19/003 |
| 2021/0379928 A1 * | 12/2021 | Lin | ........................... | B60C 7/08 |

FOREIGN PATENT DOCUMENTS

| | | |
|---|---|---|
| CN | 210454321 U | 5/2020 |
| CN | 210454323 U | 5/2020 |
| DE | 29510181 U1 | 2/1996 |
| JP | 2002-029202 A | 1/2002 |
| JP | 2017-128327 A | 7/2017 |

* cited by examiner

*Primary Examiner* — Jason R Bellinger
(74) *Attorney, Agent, or Firm* — ScienBiziP, P.C.

(57) ABSTRACT

An omnidirectional wheel includes a hub and a number of driven wheels. The hub defines a number of mounting grooves. Each mounting groove includes an axle provided therein. Each driven wheel includes a driven roller and a cover layer. Each of two ends of the driven roller defines a fixing hole. Each of the two holes receives the axle. The cover layer is sleeved on an outer side of the driven roller.

10 Claims, 3 Drawing Sheets

OMNIDIRECTIONAL WHEEL

FIELD

The subject matter herein generally relates to an omnidirectional wheel, and more particularly to an omnidirectional wheel having a simplified structure.

BACKGROUND

An omnidirectional wheel is a wheel that can move in all directions. Compared with ordinary wheels, the omnidirectional wheel has higher movement flexibility and accuracy. In the related art, a structure of the omnidirectional wheel is complicated, assembly of the omnidirectional wheel is long and cumbersome, operation of the omnidirectional wheel is inconvenient, and a manufacturing cost of the omnidirectional wheel is high.

BRIEF DESCRIPTION OF THE DRAWINGS

Implementations of the present disclosure will now be described, by way of embodiments, with reference to the attached figures.

DETAILED DESCRIPTION

Figure 1:
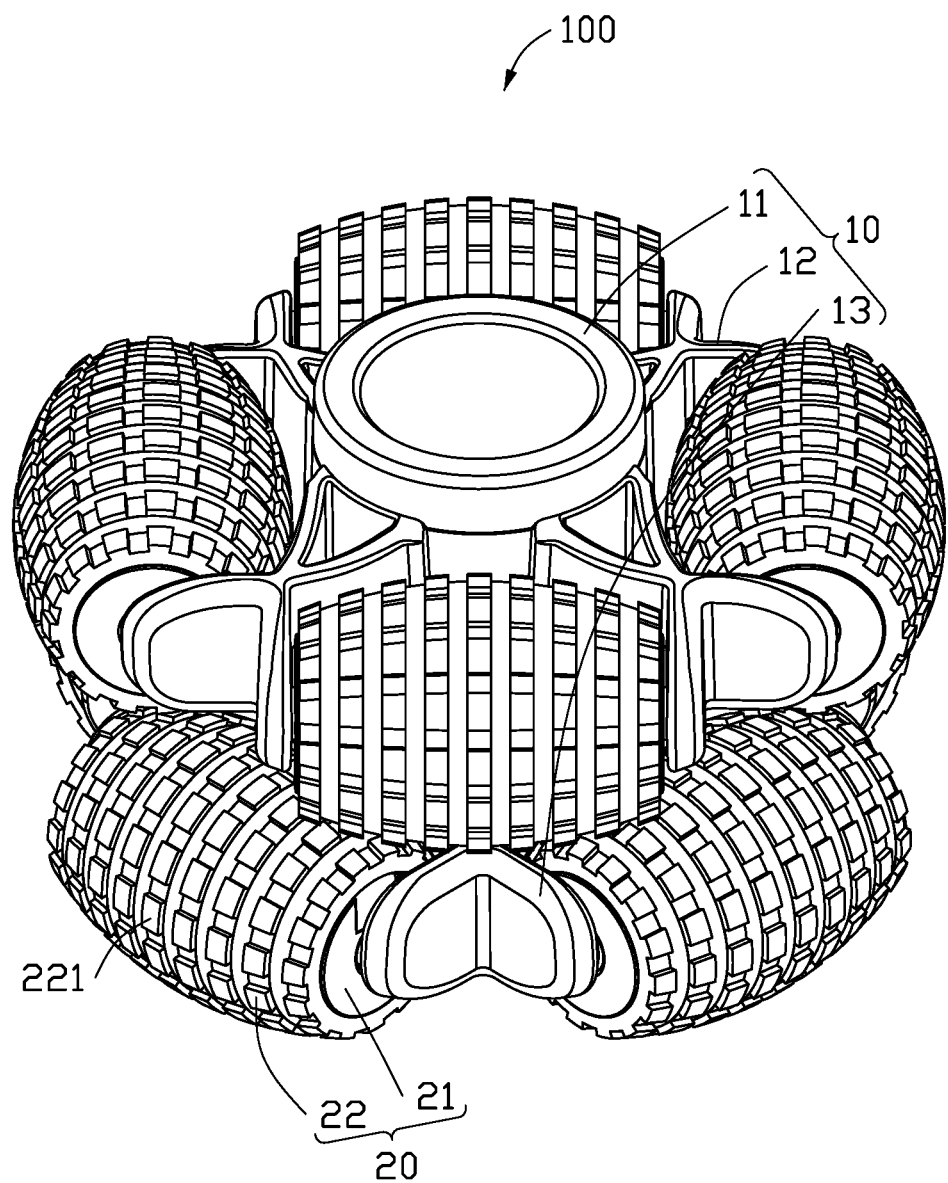
FIG. 1 is an assembled, isometric view of an embodiment of an omnidirectional wheel.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

Figure 2:
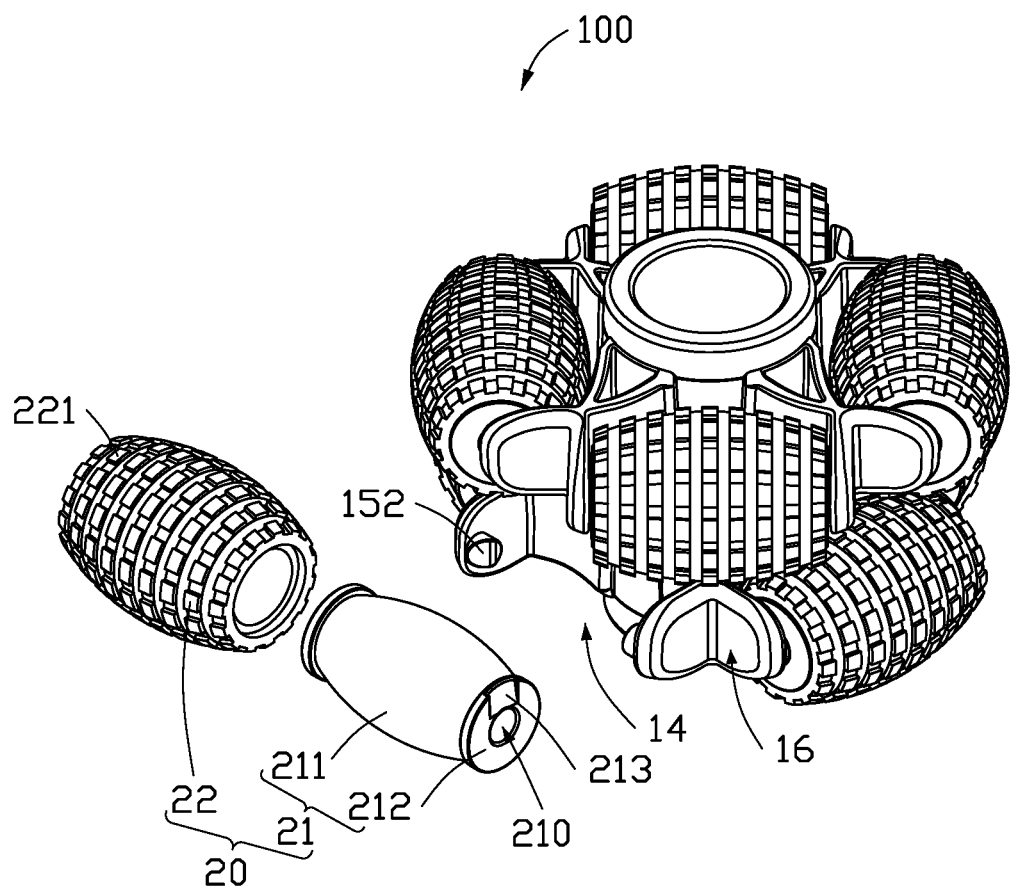
FIG. 2 is a partial exploded, isometric view of the omnidirectional wheel in FIG. 1.

FIGS. 1 and 2 show an embodiment of an omnidirectional wheel 100. The omnidirectional wheel 100 includes a hub 10 and a plurality of driven wheels 20. Each of the plurality of driven wheels 20 is rotationally mounted on the hub 10.

Figure 3:
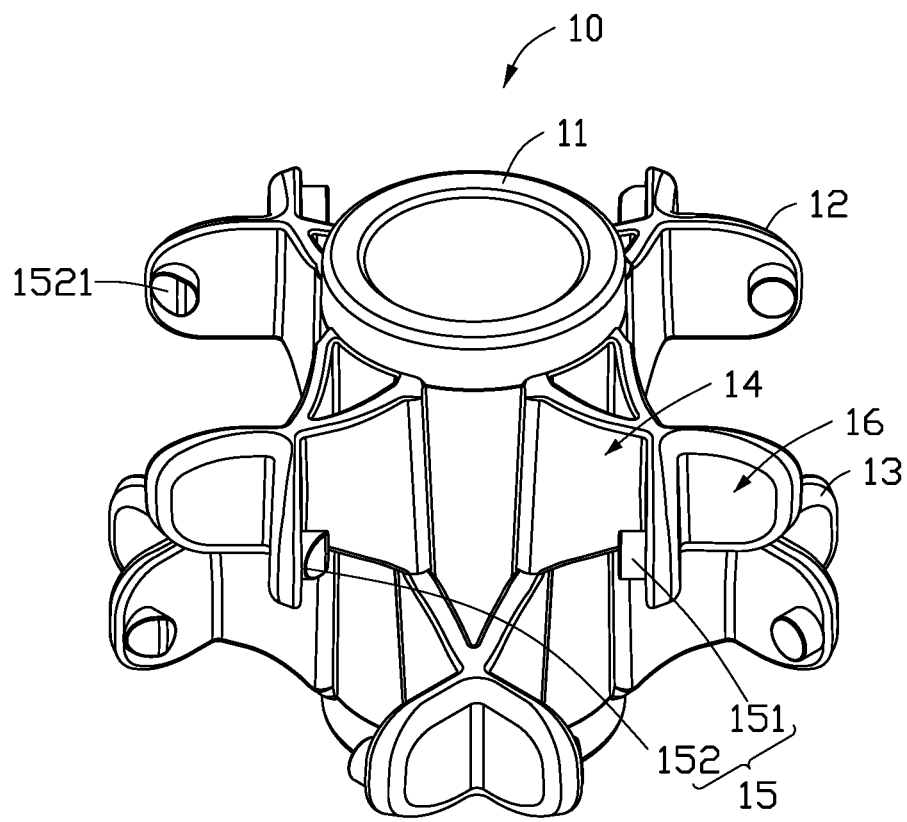
FIG. 3 is an isometric view of a hub of the omnidirectional wheel.

Referring to FIG. 3, the hub 10 includes a main body 11, a first support portion 12, and a second support portion 13. The main body 11 is substantially cylindrical. The first support portion 12 and the second support portion 13 are provided on an outer periphery of the main body 11 along an axial direction of the main body 11. The first support portion 12 and the second support portion 13 define a plurality of mounting grooves 14. The mounting grooves 14 are evenly arranged around a circumference of the main body 11, and the mounting grooves 14 of the first support portion 12 are staggered with the mounting groove 14 of the second support portion 13.

In one embodiment, four mounting grooves 14 are provided on each of the first support portion 12 and the second support portion 13.

The main body 11, the first support portion 12, and the second support portion 13 are integrally formed.

Each mounting groove 14 is provided with an axle 15 for mounting the driven wheel 20. The driven wheel 20 is provided on the axle 15 in a direction perpendicular to the axial direction of the main body 11.

The axle 15 includes a rotating shaft 151 and a mounting shaft 152 disposed in the mounting groove 14 facing each other and perpendicular to the axial direction of the main body 11. The rotating shaft 151 and the mounting shaft 152 are respectively used for mounting one side of the driven wheel 20 to mount the driven wheel 20 in the mounting groove 14.

The rotating shaft 151 is substantially cylindrical.

A mounting surface 1521 is provided at an end of the mounting shaft 152 facing the rotation shaft 151. The mounting surface 1521 is inclined outward of the mounting groove 14 to facilitate mounting the driven wheel 20.

The driven wheel 20 includes a driven roller 21 and a cover layer 22. Two ends of the driven roller 21 respectively define a fixing hole 210. The fixing holes 210 respectively receive the rotating shaft 151 and the mounting shaft 152 to mount the driven roller 21 on the axle 15. The cover layer 22 is sheathed on an outside of the driven roller 21.

The driven roller 21 includes a barrel 211 and two fixing portions 212. The barrel 211 is substantially drum barrel-shaped. The cover layer 22 is sleeved on the barrel 211. The two fixing portions 212 are respectively located on opposite sides of the barrel 211 to fix the cover layer 22 on the barrel 211 when the cover layer 22 is sleeved on the barrel 211. The fixing holes 210 are defined in the fixing portions 212, respectively.

The barrel 211 and the two fixing portions 212 are integrally formed.

Each fixing portion 212 further defines an installation groove 213. The installation groove 213 is inclined along a radial direction of the driven roller 21. One end of the installation groove 213 extends toward the outer periphery of the driven roller 21, and the other end extends toward the fixing hole 210 to conveniently sleeve the fixing hole 210 on the rotating shaft 151.

A material of the driven roller 21 may be selected from metals, alloys, hard plastics, and the like. The driven roller 21 can be injection molded.

A plurality of non-slip portions 221 is provided on a surface of the cover layer 22. The non-slip portions 221 are provided along a circumferential direction of the cover layer 22. The non-slip portions 221 are used to prevent the driven wheel 20 from slipping during use.

A material of the cover layer 22 may be rubber, but is not limited thereto.

In an assembly of one driving wheel 20, the cover layer 22 is first sleeved on the barrel 211 of the driven roller 21 to form the driven wheel 20. Then, the fixing portion 212 defining the installation groove 213 is sleeved on the rotating shaft 151 by guiding the rotating shaft 151 through the installation groove 213 until the installation groove 213 inserts into the fixing hole 210, and then the other fixing portion 212 is sleeved on the mounting shaft 152 by guiding the other fixing portion 212 along the mounting surface 1521 until the mounting shaft 152 is inserted into the fixing hole 210, thereby completing assembly of the driven wheel 20. The rest of the driven wheels 20 are assembled in the same way.

In one embodiment, a cutout 16 is defined between each adjacent two mounting grooves 14 of the first support portion 12 and the second support portion 13. The cutouts 16 facilitate deformation of the mounting grooves 14 when the driven wheels 20 are assembled in the mounting grooves 14.

In another embodiment, the axles 15 can be provided on the driven rollers 21. Correspondingly, the fixing holes 210 are provided in the mounting grooves 14.

The hub 10 is integrally formed, and the mounting grooves 14 have the axles 15 directly provided therein. The cover layer 22 is sleeved on the driven roller 21 to form the driven wheel 20, which is mounted onto the axle 15 by interference fit through the fixing holes 210 provided at both ends of the driven roller 21, so as to realize the assembly of the omnidirectional wheel 100. The structure is simple, the assembly is convenient, and fewer parts are required, which improves the efficiency of assembly and lowers manufacturing costs.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An omnidirectional wheel comprising:
a hub; and
a plurality of driven wheels; wherein:
the hub defines a plurality of mounting grooves;
each mounting groove comprises an axle provided therein;
each of the plurality of driven wheels comprises a driven roller and a cover layer;
each of two ends of the driven roller defines a fixing hole;
each of the two holes receives the axle; and
the cover layer is sleeved on an outer side of the driven roller;
the hub comprises a main body, a first support portion, and a second support portion;
the first support portion and the second support portion are provided on an outer periphery of the main body along an axial direction of the main body;
the first support portion and the second support portion define the plurality of mounting grooves;
the plurality of mounting grooves is evenly arranged around a circumference of the main body; and
the plurality of mounting grooves of the first support portion is staggered with the plurality of mounting grooves of the second support portion;
the driven roller is rotationally provided on the axle perpendicular to an axial direction of the main body;
the axle comprises a rotating shaft and a mounting shaft disposed in the mounting groove facing each other and perpendicular to the axial direction of the main body;
each of the rotating shaft and the mounting shaft is inserted into a corresponding fixing hole defined in the driven roller to mount the driven roller in the mounting groove.

2. The omnidirectional wheel of claim 1, wherein:
each of the first support portion and the second support portion defines four mounting grooves.

3. The omnidirectional wheel of claim 1, wherein:
the main body, the first support portion, and the second support portion are integrally formed.

4. The omnidirectional wheel of claim 1, wherein:
a mounting surface is provided at an end of the mounting shaft facing the rotation shaft; and
the mounting surface is inclined outward of the mounting groove.

5. The omnidirectional wheel of claim 1, wherein:
the driven roller comprises a barrel and two fixing portions;
the cover layer is sleeved on the barrel;
the two fixing portions are respectively located on opposite sides of the barrel and fix the cover layer on the barrel; and
the fixing holes are defined in the two fixing portions, respectively.

6. The omnidirectional wheel of claim 5, wherein:
each of the two fixing portions further defines an installation groove;
the installation groove is inclined along a radial direction of the driven roller;
one end of the installation groove extends toward the outer periphery of the driven roller, and the other end extends toward the fixing hole.

7. The omnidirectional wheel of claim 5, wherein:
the barrel and the two fixing portions are integrally formed.

8. An omnidirectional wheel comprising:
a hub; and
a plurality of driven wheels; wherein:
the hub defines a plurality of mounting grooves;
a cutout is defined between each adjacent two mounting grooves of a first support portion and a second support portion;
each mounting groove comprises an axle provided therein;
each of the plurality of driven wheels comprises a driven roller and a cover layer;
the driven roller comprises a barrel and two fixing portions;
the cover layer is sleeved on the barrel;
the two fixing portions are respectively located on opposite sides of the barrel and fix the cover layer on the barrel; and
each of the two fixing portions defines a fixing hole;
the driven roller is sleeved on the axle by the two fixing holes receiving the axle; and
the cover layer is sleeved on an outer side of the driven roller;
the hub comprises a main body, the first support portion, and the second support portion;
the first support portion and the second support portion are provided on an outer periphery of the main body along an axial direction of the main body;
the first support portion and the second support portion define the plurality of mounting grooves;
the plurality of mounting grooves is evenly arranged around a circumference of the main body; and the plurality of mounting grooves of the first support portion is staggered with the plurality of mounting grooves of the second support portion;

the driven roller is rotationally provided on the axle perpendicular to an axial direction of the main body;

the axle comprises a rotating shaft and a mounting shaft disposed in the mounting groove facing each other and perpendicular to the axial direction of the main body;

each of the rotating shaft and the mounting shaft is inserted into a corresponding fixing hole defined in the driven roller to mount the driven roller in the mounting groove.

9. The omnidirectional wheel of claim 8, wherein:

a mounting surface is provided at an end of the mounting shaft facing the rotation shaft; and the mounting surface is inclined outward of the mounting groove.

10. The omnidirectional wheel of claim 9, wherein:

each of the two fixing portions further defines an installation groove;

the installation groove is inclined along a radial direction of the driven roller;

one end of the installation groove extends toward the outer periphery of the driven roller, and the other end extends toward the fixing hole.

* * * * *